Aug. 15, 1950    H. J. FINDLEY    2,519,241
THERMOELECTRIC GENERATOR AND BURNER THEREFOR
Filed July 5, 1946
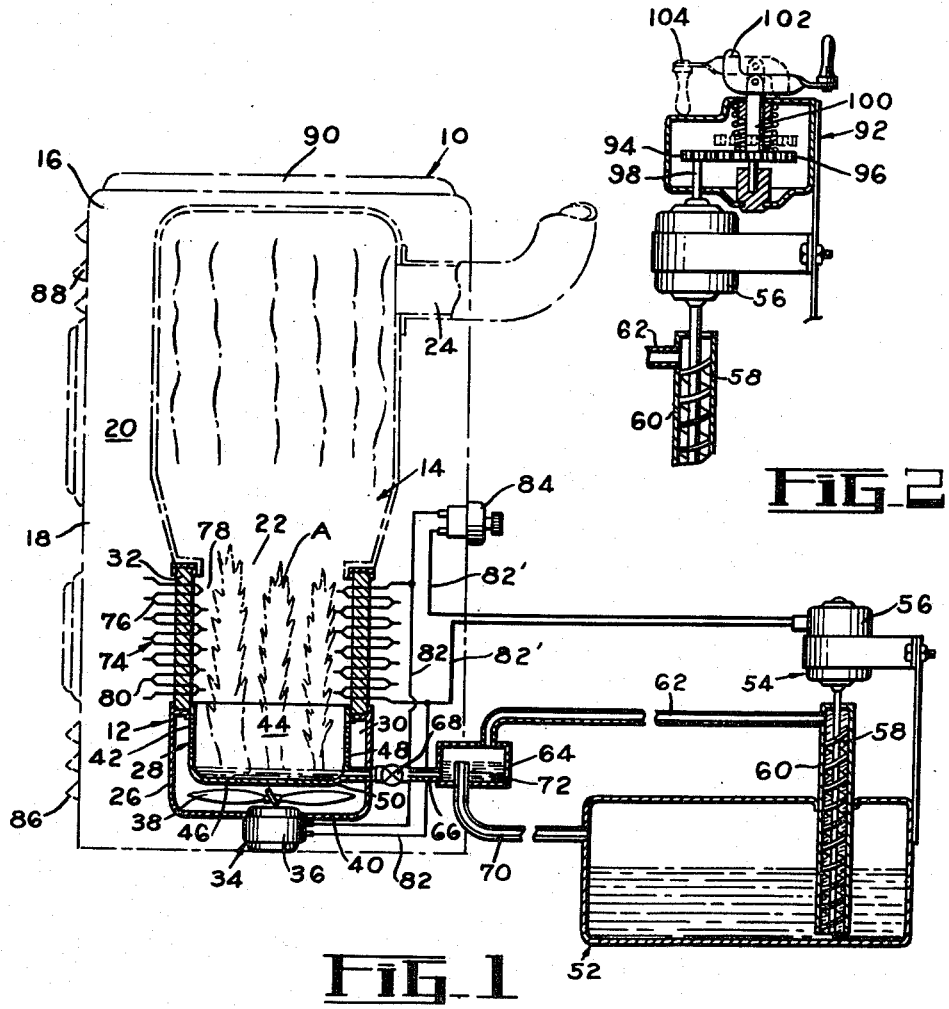
INVENTOR.
HOWARD J. FINDLEY
BY
ATTORNEYS Patented Aug. 15, 1950

2,519,241

UNITED STATES PATENT OFFICE 2,519,241

THERMOELECTRIC GENERATOR AND BURNER THEREFOR

Howard J. Findley, Chardon, Ohio, assignor to Eaton Manufacturing Company, Cleveland, Ohio, a corporation of Ohio Application July 5, 1946, Serial No. 681,565

5 Claims. (Cl. 126—116)

This invention relates to fuel combustion heating apparatus and more particularly to heating apparatus having thermoelectric generator apparatus associated therewith and operated thereby.

Broadly the invention comprehends an improved fuel combustion heating apparatus having a thermoelectric generator incorporated therein which is supplied heat from the fuel burner of the heating apparatus and wherein the electrical output of the generator drives an impelling means operable to supply combustion air to the burner and pump means for supplying fuel to the burner.

An object of this invention is the provision of fuel burning and heating apparatus that through the incorporation therein of a thermoelectric generator provides for the generation of electrical power sufficient to automatically supply the required combustion fuel and control the supply of combustion air to the burner to suit the requirements thereof.

Another object of this invention is the provision of improved fuel combustion heating apparatus having a thermoelectric generator incorporated in the apparatus in the path of the combustion heat of the burner of the apparatus for operating the generator for the production of electrical power sufficient to operate fuel and air supplying means for the burner, wherein the air supplying means automatically controls the predetermined normal output of heat from the apparatus.

Other objects and advantages of the invention will appear from the following description taken in connection with the drawings, forming a part of the specification, and in which:

Fig. 1 is a longitudinal cross sectional elevational partially diagrammatic view showing a fuel combustion heating apparatus incorporating a thermoelectric generator and electrical devices for the apparatus powered by the generator; and Fig. 2 is a longitudinal fragmentary partially cross sectional view of manually operable means for priming the fuel delivery pump shown by Fig. 1.

It has been the practice in the past relative to fuel combustion heating apparatus of the type herein disclosed, where as in rural districts or other remote places and the like, electrical power is not available, to gravitationally deliver fuel to the fuel burner of the apparatus. The instant invention eliminates the necessity of gravitational flow of the fuel in an apparatus of this kind through the incorporation of a thermoelectric generator in the apparatus, wherein sufficient electrical power is generated from the heat imparted to the generator by the ignited fuel of the apparatus to operate an electrically driven pump for supplying fuel directly to the fuel burner. By this innovation fuel tanks which were required to be suspended at a point above the fuel burner can now be built into or below the floor casement out of sight thus improving the overall appearance of the heating apparatus as well as eliminating some of the control apparatus required by gravitational feed methods.

This application contains subject matter in common with my co-pending application Ser. No. 651,567, filed March 2, 1946 now Patent Number 2,501,627, issued March 21, 1950, said matter being similar combustion and heat transfer apparatus.

Referring to the drawings for more specific details of the invention 10 represents a fuel combustion heating apparatus including a burner or combustion unit 12 for supplying heat to combustion chamber 14 which can be used for supplying heat for any desired purpose and is here shown as applied to an upright space heater 16.

The space heater 16 is shown diagrammatically as having an outer housing 18 disposed about the combustion chamber 14 so as to provide a passage 20 therebetween for the upward flow of air to be heated. The combustion chamber 14 is provided with an opening 22 through which flame and combustion gases may be delivered into the chamber from the burner unit 12 and an exhaust connection or flue 24 for carrying away smoke and gases after they have passed through the chamber.

The burner or combustion unit 12 includes an elongated outer housing 26 and a hollow burner 28 concentrically disposed in and spaced from the housing 26 so as to provide an annular air space or passage 30 therebetween. The housing 26 and burner 28 are both concentrically mounted upon a tubular member 32, said member in turn being secured upon the combustion chamber housing at the opening 22 into the combustion chamber, whereby the outlet opening for the hollow burner 28 is disposed in substantially concentric alignment with the opening 22 into the combustion chamber.

The base of the housing 26 supports an electrically driven air impelling device 34 comprising an electric motor 36 mounted in an opening in the base of the housing 26 and a fan or blower 38 driven thereby mounted on the motor shaft so as to be located inwardly of air inlet openings 40 in the base of the housing between the burner 28 and housing 26.

The burner 28 comprises a tubular body member 42 having an open end 44 and a closed end 46 with the side wall of the burner being provided with a plurality of openings or perforations 48 for the passage of combustion air delivered by the fan 38 from the space 30. The burner 28 at its closed end 46 provides a fuel pot 50 for holding the fuel delivered thereto to be burned in combination with the combustion air supplied through openings 48.

The fuel to be burned in the burner unit 12 is preferably a liquid fuel such as fuel oil, although a gaseous fuel could be burned if desired. The fuel supply is contained in a suitable tank 52 located wherever desired or convenient and may be built into the floor adjacent the heating apparatus so as to improve the combined and overall appearance of the heating apparatus. The fuel is delivered to the fuel pot 50 of the burner by the action of a pumping apparatus 54 mounted upon the tank comprising an electric motor 56 and a spiral pump rotor 58 driven from the motor mounted in an elongated tubular body 60 extending through the top of the tank 52 to a point adjacent the bottom thereof, with the extremity of the tube open for the receipt of fuel from the tank. The fuel is fed by the tubular body 60 through the rotary action of the pump rotor 58 through conduit 62 into a leveling chamber 64 and thence from the chamber 64 to the fuel pot through conduit 66 controlled as by manually operable valve 68 for controlling the desired rate at which the fuel is to be fed to the pot. As a means of maintaining a desired fuel level in chamber 64 a pipe or conduit 70 is provided having a portion 72 thereof extending into the chamber from the bottom thereof to a desired height such that upon the delivery of fuel to chamber 64 to a level above the top of conduit 70 the excess fuel is delivered through the conduit back to the fuel tank 52. The chamber 64 is located at an elevation relative to the burner pot 50 such that a safe fuel level will be maintained in the pot in the event the control valve 68 is left open.

Electrical power for the operation of electrical motors 36 and 56 for the respective fan or blower 38 and pump rotor 58 is derived from a thermoelectric generator or thermopile 74 which utilizes heat from the burner 28 and generates electric current.

The thermopile 74 comprises the tubular member 32 formed of refractory and electrical insulating material and a plurality of thermocouple elements or groups of elements 76 supported on and extending through the wall member 32. The thermocouples 76 are constructed of suitable metals of dissimilar character so as to provide groups of hot and cold thermocouple junctions 78 and 80 respectively disposed around the inside and outside member 32. The thermocouple junctions are electrically connected in series and the electrical motors 36 and 56 respectively of the fan and pump are connected with the terminals of the thermopile by a pair of conductors 82 and 82¹, said electrical motor 56 for the pump having a manual rheostat control 84 in the conductor line 82¹ for controlling the speed of operation thereof.

The space heater housing 18 has inlet openings or louvers 86 and 88 for the inflow of air to be heated and air which is supplied to the burner through openings 40 in the housing 26, the heated air in turn passing through space 20 between the combustion chamber and interior of the housing 18 and exiting through a suitable opening or openings 90 in the top of the space heater 16.

Fig. 2 illustrates the incorporation of a manually operable gear box 92 upon the output shaft of the motor 56 for use in manually pumping a sufficient amount of fuel into the burner pot 50 in the event prior to the operation of the heating apparatus 10 there is not a sufficient quantity of fuel in the pot to produce the required heat for an electrical power output of the thermoelectric generator necessary to operate the motor 56. The gear box 92, as shown, is mounted above the motor 56 and includes a pair of meshing gears 94 and 96 suitable for providing a step-up speed ratio, gear 94 being keyed to an output shaft 98 of the motor 56 and gear 96 being keyed upon a shaft 100 journaled in the gear box. The gear 96 is spring pressed into engagement with gear 94 and is both rotatable by and released from meshing engagement with gear 94 by a crank arm 102 pivotally secured to the shaft 94 of gear 96. With the crank arm in position as shown by the full line in Fig. 2 a rotation of the arm in a plane perpendicular to the shaft 100 will effect the rotation of the shaft 100, gear 96, gear 94, motor shaft 98, and pump rotor 58 sufficient to effect a pumping of the fuel from the tank to the burner pot 50. After a sufficient quantity of fuel is hand-pumped to the pot and hand-rotation of the pump is no further required the crank arm is pivoted to the position of the dotted lines 104 thus disengaging gear 96 from gear 94 and permitting free rotation of output shaft 98 of the motor 56 as electrical power is supplied to the motor from the thermopile upon heating of the thermocouple junctions from the fire and heat of ignited fuel in combustion unit 12.

In a normal operation of heating apparatus 10 wherein a sufficient quantity of fuel is collected in the pot the fuel is ignited causing an initial heating of the pot and adjacent burner structure. After this initial heating the valve 68 is set at a position to provide for the feeding of fuel to the pot at a desired rate and as the fuel flows into the heated pot from the conduit 66 it becomes vaporized and mixed with air which enters through the openings 48. The fuel and air mixture in the burner 28 burns with a sustained flame as represented by A and the flame and combustion gases are delivered from the burner through the open end 44 thereof and through the thermopile 74 into the combustion chamber 14.

The flame and gases passing through the thermopile 74 heat the inner junctions 78 of the thermocouples whereas the outer junctions 80 are cooled by the air passing through the combustion chamber and outer housing 18. The temperature differential between the inner and outer junctions causes electrical current to be generated in the thermocouple junctions so as to provide for a supply of electrical current for the electric motors 36 and 56 for the operation of the respective fan or blower 38 and pump rotor 58. The consequent rotation of the fan 38 effects an inflow of air through the openings 40 into the air space 30 whereas the rotation of the pump rotor 58 supplies fuel to the burner pot through the leveling chamber 64. The air delivered into space 30 passes through openings 48 into and through the burner in a direction through opening 44 and the thermopile into the combustion chamber. The air inflow through the burner also flows across the fuel pot 50 and thus becomes thoroughly mixed with the fuel vapors issuing from the pot.

The fuel burning method herein provided relative to the supply of combustion air by air impelling device 34 is claimed specifically as a part of my co-pending application Ser. No. 651,567 for Combustion Apparatus and Control, filed March 2, 1946, now Patent Number 2,501,627, issued March 21, 1950, wherein an important automatic control function is obtained by reason of the use of a thermoelectric generator for operating the air impelling device 34. This thermoelectric generator cooperates with the burner in such a manner that it tends to maintain the burner at its most efficient operating condition at which the correct amount of combustion air is supplied and at which the fuel and air mixture is efficiently burned. In explanation of this temperature control function it is pointed out if the combustion air being supplied by the impelling device 34 is in excess of that needed for the amount of fuel being fed to the burner, the excess air will cause a descrease in the temperature at which the inner junctions 78 of the thermopile are heated and this will cause a corresponding decrease in the electrical output of the thermoelectric generator. The decreased output of the thermoelectric generator will cause a decrease in the speed at which the fan 38 is driven by the motor 36 and the supply of air to the burner will be thereby decreased until it is the correct amount for the amount of fuel being fed, whereupon a stable and efficient operating condition will be maintained.

If the amount of air being supplied by the impelling device 34 is too small for the amount of fuel being fed, the fuel will be burned with a more radiant and relatively shorter flame, and therefore, will be in a more direct heat delivering capacity with the inner junctions 38 of the thermopile. This condition will produce an increase in the electrical output of the thermoelectric generator and corresponding increase in the speed of the fan 38 and the volume of air being supplied to the burner. Because of this automatic control function of the thermopile the volume of air being supplied to the burner will be automatically varied as changes occur in the operation and heat output of the burner and the thermopile will at all times tend to maintain a stable operating condition in which the correct amount of air is being supplied for an efficient combustion of the fuel.

Simultaneously with the automatic controlled operation of the burner by the air impelling means the power supplied to the pump motor 55 is controlled by manually operable rheostatic means 84 for controlling the motor to the normal speed necessary to supply a volume of fuel desired for normal operation of the burner regardless of the electrical power output of the thermopile 74 just so long as a sufficient amount is supplied to meet the requirements of the apparatus 10.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. In heating apparatus of the character described, a housing having therein a hollow heating member and an air passage extending in heat-exchange relation to said member and including an inlet for the air to be heated and an outlet for delivering the heated air into a space to be heated and whose temperature is to be controlled, a fuel burner having an inlet for combustion air and being operable to deliver a burning fuel and air mixture, a hollow thermopile forming a conduit between said burner and said hollow heating member for directing the burning fuel and air mixture into the latter having thermocouple junctions adapted to be heated by said burning mixture for the generation of electricity, a pumping apparatus operable to supply fuel to said burner, an air impelling apparatus operable to supply combustion air to said burner, a variable speed electric motor electrically connected with said thermopile to be energized therefrom and mechanically connected with said impelling apparatus for driving the same such that combustion air is supplied to said burner at a rate corresponding substantially with the electric power delivered by said thermopile and substantially with an optimum combustion condition of operation for the burner, a variable speed electric motor electrically connected with said thermopile to be energized therefrom and mechanically connected with said pumping apparatus such that fuel is supplied to said burner at a rate corresponding substantially with the electric power delivered by the thermopile and means for varying the speed of operation of the pump.

2. In heating apparatus of the character described, a housing having therein a hollow heating member and an air passage extending in heat-exchange relation to said member and including an inlet for the air to be heated and an outlet for delivering the heated air into a space to be heated and whose temperature is to be controlled, a fuel burner having an inlet for combustion air and being operable to deliver a burning fuel and air mixture, a hollow thermopile forming a conduit between said burner and said hollow heating member for directing the burning fuel and air mixture into the latter and having thermocouple junctions adapted to be heated by said burning mixture for the generation of electricity, a pumping apparatus operable to supply fuel to said burner, an air impelling apparatus operable to supply combustion air to said burner, a variable speed electric motor electrically connected with said thermopile to be energized therefrom and mechanically connected with said impelling apparatus for driving the same such that combustion air is supplied to said burner at a rate corresponding substantially with the electric power delivered by said thermopile and substantially with an optimum combustion condition of operation for the burner, a variable speed electric motor electrically connected with said thermopile to be energized therefrom and mechanically connected with said pumping apparatus such that fuel is supplied to said burner at a rate corresponding substantially with the electric power delivered by the thermopile and rheostatic control means in the connection of the thermopile with the electric motor for the pump apparatus for establishing the desired speed of operation of the pump apparatus.

3. In heating apparatus of the character described, a housing having therein a hollow heating member and an air passage extending in heat-exchange relation to said member and including an inlet for the air to be heated and an outlet for delivering the heated air into a space to be heated and whose temperature is to be controlled, a fuel burner having an inlet for combustion air and being operable to deliver a burning fuel and air mixture, a hollow thermopile forming a conduit between said burner and said hollow heating member for directing the burning fuel and air mixture into the latter and having thermocouple junctions adapted to be heated by said burning mixture for the generation of electricity, a pumping apparatus operable to supply fuel to said burner, an air impelling apparatus operable to supply combustion air to said burner, a variable speed electric motor electrically connected with said thermopile to be energized therefrom and mechanically connected with said impelling apparatus for driving the same such that combustion air is supplied to said burner at a rate corresponding substantially with the electric power delivered by said thermopile and substantially with an optimum combustion condition of operation for the burner, a variable speed electric motor electrically connected with said thermopile to be energized therefrom and mechanically connected with said pumping apparatus such that fuel is supplied to said burner at a rate corresponding substantially with the electric power delivered by the thermopile and control means for the pumping apparatus effective to vary the rate of output of fuel therefrom for delivery to said burner.

4. In heating apparatus of the character described, a housing having therein a hollow heating member and an air passage extending in heat-exchange relation to said member and including an inlet for the air to be heated and an outlet for delivering the heated air into a space to be heated and whose temperature is to be controlled, a fuel burner having an inlet for combustion air and being operable to deliver a burning fuel and air mixture, a hollow thermopile forming a conduit between said burner and said hollow heating member for directing the burning fuel and air mixture into the latter and having thermocouple junctions adapted to be heated by said burning mixture for the generation of electricity, a pumping apparatus operable to supply fuel to said burner, an air impelling apparatus operable to supply combustion air to said burner, a variable speed electric motor electrically connected with said thermopile to be energized therefrom and mechanically connected with said impelling apparatus for driving the same such that combustion air is supplied to said burner at a rate corresponding substantially with the electric power delivered by said thermopile and substantially with an optimum combustion condition of operation for the burner, a variable speed electric motor electrically connected with said thermopile to be energized therefrom and mechanically connected with said pumping apparatus such that fuel is supplied to said burner at a rate corresponding substantially with the electric power delivered by the thermopile, a fuel tank communicating with the pumping apparatus, a conduit for conveying fuel from the pumping apparatus to the burner, a level chamber in the conduit intermediate the pumping apparatus and burner providing an overflow connection with the fuel tank and a manually operable rheostatic control means in the electrical connection between the electric motor for the pumping apparatus and the thermopile for establishing the substantially constant speed of operation desired for the pumping apparatus.

5. In heating apparatus of the character described, a housing having therein a hollow heating member and an air passage extending in heat-exchange relation to said member and including an inlet for the air to be heated and an outlet for delivering the heated air into a space to be heated and whose temperature is to be controlled, a fuel burner having an inlet for combustion air and being operable to deliver a burning fuel and air mixture, a hollow thermopile forming a conduit between said burner and said hollow heating member for directing the burning fuel and air mixture into the latter and having thermocouple junctions adapted to be heated by said burning mixture for the generation of electricity, a pumping apparatus operable to supply fuel to said burner, an air impelling apparatus operable to supply combustion air to said burner, a variable speed electric motor electrically connected with said thermopile to be energized therefrom and mechanically connected with said impelling apparatus for driving the same such that combustion air is supplied to said burner at a rate corresponding substantially with the electric power delivered by said thermopile and substantially with an optimum combustion condition of operation for the burner, a variable speed electric motor electrically connected with said thermopile to be energized therefrom and mechanically connected with said pumping apparatus such that fuel is supplied to said burner at a rate corresponding substantially with the electric power delivered by the thermopile, rheostatic control means in the connection of the thermopile with the electric motor for the pumping apparatus for establishing the desired speed of operation of the pumping apparatus and manual rotary means for operating the pump independent of the electrical operation thereof.

HOWARD J. FINDLEY.

REFERENCES CITED

The following references are of record in the file of this patent:

UNITED STATES PATENTS

| Number | Name | Date |
| --- | --- | --- |
| 2,015,610 | Underwood | Sept. 24, 1935 |
| 2,179,041 | Hoffman | Nov. 7, 1939 |
| 2,269,337 | Dulaney | Jan. 6, 1942 |
| 2,362,258 | Findley | Nov. 7, 1944 |
| 2,362,259 | Findley | Nov. 7, 1944 |
| 2,363,168 | Findley | Nov. 21, 1944 |
| 2,390,578 | Findley | Dec. 11, 1945 |